(12) United States Patent
Suzuki et al.

(10) Patent No.: US 9,204,316 B2
(45) Date of Patent: Dec. 1, 2015

(54) ENHANCEMENT AND IMPROVEMENT FOR HETNET DEPLOYMENTS

(75) Inventors: Takashi Suzuki, Ichikawa (JP); Zhijun Cai, Euless, TX (US); Rene Warapurtra Purnadi, Irving, TX (US); Yi Yu, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 202 days.

(21) Appl. No.: 13/250,486

(22) Filed: Sep. 30, 2011

(65) Prior Publication Data

US 2013/0084910 A1  Apr. 4, 2013

(51) Int. Cl.
H04W 4/00 (2009.01)
H04W 24/00 (2009.01)
H04W 24/02 (2009.01)
H04W 84/04 (2009.01)

(52) U.S. Cl.
CPC ............ *H04W 24/02* (2013.01); *H04W 84/045* (2013.01)

(58) Field of Classification Search
CPC ... H04L 1/1845; H04L 1/1887; H04W 28/04; H04W 36/02
USPC ....................................................... 455/515
See application file for complete search history.

(56) References Cited

U.S. PATENT DOCUMENTS

| | | |
|---|---|---|
| 8,072,915 B1 | 12/2011 | Gutierrez et al. |
| 8,743,723 B2 | 6/2014 | Watfa et al. |
| 8,755,316 B2 | 6/2014 | Aschan et al. |
| 2002/0041575 A1 | 4/2002 | Karabinis et al. |
| 2003/0118123 A1 | 6/2003 | Hudson et al. |
| 2003/0165120 A1 | 9/2003 | Uesugi et al. |
| 2004/0240400 A1 | 12/2004 | Khan |
| 2006/0194576 A1 | 8/2006 | Karabinis et al. |
| 2008/0192703 A1 | 8/2008 | Suzuki |
| 2008/0207170 A1 | 8/2008 | Khetawat et al. |
| 2008/0207229 A1 | 8/2008 | Cave et al. |
| 2008/0279194 A1* | 11/2008 | Tseng ............... H04L 1/1835 370/394 |
| 2009/0092103 A1 | 4/2009 | Rao |
| 2009/0103500 A1 | 4/2009 | Malkamaki et al. |
| 2009/0143072 A1 | 6/2009 | Montojo et al. |
| 2009/0225708 A1 | 9/2009 | Harada et al. |
| 2010/0034139 A1* | 2/2010 | Love ............... H04L 1/0029 370/328 |

(Continued)

FOREIGN PATENT DOCUMENTS

| | | |
|---|---|---|
| EP | 2166804 A1 | 3/2010 |
| JP | 2011519516 A | 7/2011 |

(Continued)

OTHER PUBLICATIONS

3GPP TS 36.300 V10.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2, Release 10; Jun. 2011; 194 pages.

(Continued)

*Primary Examiner* — Bobbak Safaipour
(74) *Attorney, Agent, or Firm* — Conley Rose, P.C.; J. Robert Brown, Jr.

(57) ABSTRACT

A method is provided for communication. The method comprises, when a measurement resource restriction is configured, verifying whether stored system information is valid by examining a system information identifier after a modification period has occurred.

16 Claims, 7 Drawing Sheets

(56) References Cited

U.S. PATENT DOCUMENTS

| | | | |
|---|---|---|---|
| 2010/0074206 A1 | 3/2010 | Yu et al. | |
| 2010/0080139 A1 | 4/2010 | Palanki et al. | |
| 2010/0095183 A1* | 4/2010 | Petrovic | H04L 1/1887 714/748 |
| 2010/0167750 A1* | 7/2010 | Lee | H04W 48/12 455/450 |
| 2010/0182939 A1 | 7/2010 | Ojala et al. | |
| 2010/0227606 A1 | 9/2010 | Nan et al. | |
| 2010/0240400 A1* | 9/2010 | Choi | H04W 68/02 455/458 |
| 2010/0272004 A1* | 10/2010 | Maeda | H04L 5/0007 370/312 |
| 2010/0296427 A1* | 11/2010 | Lohr | H04L 1/1845 370/312 |
| 2010/0322174 A1* | 12/2010 | Ji | H04W 74/006 370/329 |
| 2011/0038277 A1 | 2/2011 | Hu et al. | |
| 2011/0053625 A1 | 3/2011 | Ishii et al. | |
| 2011/0223924 A1 | 9/2011 | Lohr et al. | |
| 2011/0250919 A1 | 10/2011 | Barbieri et al. | |
| 2011/0270984 A1* | 11/2011 | Park | H04W 4/00 709/225 |
| 2012/0044818 A1 | 2/2012 | Lindoff et al. | |
| 2012/0113843 A1 | 5/2012 | Watfa et al. | |
| 2012/0115485 A1 | 5/2012 | Narasimha et al. | |
| 2012/0170541 A1* | 7/2012 | Love | H04L 1/0029 370/329 |
| 2012/0307922 A1* | 12/2012 | Simonsson | H04W 24/10 375/260 |
| 2013/0039338 A1* | 2/2013 | Suzuki | H04W 36/0094 370/331 |
| 2013/0077507 A1* | 3/2013 | Yu | H04W 48/16 370/252 |
| 2013/0114483 A1* | 5/2013 | Suzuki | H04W 76/048 370/311 |
| 2013/0114484 A1* | 5/2013 | Suzuki | H04W 68/025 370/311 |
| 2013/0114573 A1* | 5/2013 | Suzuki | H04L 1/1887 370/336 |
| 2013/0128765 A1* | 5/2013 | Yang | H04W 24/00 370/252 |
| 2015/0044972 A1* | 2/2015 | Lee | H04W 24/10 455/67.11 |

FOREIGN PATENT DOCUMENTS

| | | |
|---|---|---|
| KR | 20100010384 A | 2/2010 |
| KR | 100956828 B1 | 5/2010 |
| KR | 20110063279 A | 6/2011 |
| TW | 201127147 A | 8/2011 |
| WO | 2010032124 A1 | 3/2010 |
| WO | 2011133708 A1 | 10/2011 |

OTHER PUBLICATIONS

3GPP TR 36.805 V1.2.0; 3rd Generation Partnership Project; Technical Specification Group Radio Access Network; Study on Minimization of Drive-Tests in Next Generation Networks; Release 9; Aug. 2009; 18 pages.

3GPP TS 36.331 V10.2.0; 3rd Generation Partnership Project; Technical Specification Group Radio Access Network; Evolved Universal Terrestrial Radio Access (E-UTRA); Radio Resource Control (RRC); Protocol Specification; Release 10; Jun. 2011; 294 pages.

3GPP TS 36.304 V10.2.0; 3rd Generation Partnership Project; Technical Specification Group Radio Access Network; Evolved Universal Terrestrial Radio Access (E-UTRA); User Equipment (UE) Procedures in Idle Mode; Release 10; Jun. 2011; 33 pages.

3GPP TS 36.321 V10.2.0; 3rd Generation Partnership Project; Technical Specification Group Radio Access Network; Evolved Universal Terrestrial Radio Access (E-UTRA); Medium Access Control (MAC) Protocol Specification; Release 10; Jun. 2011; 54 pages.

3GPP TS 37.320 V10.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Radio Measurement Collection for Minimization of Drive Tests (MDT); Overall Description; Stage 2, Release 10; Jun. 2011; 17 pages.

3GPP TS 36.211 V10.2.0; 3rd Generation Partnership Project; Technical Specification Group Radio Access Network; Evolved Universal Terrestrial Radio Access (E-UTRA); Physical Channels and Modulation; Release 10; Jun. 2011; 103 pages.

Suzuki, Takashi; U.S. Appl. No. 13/545,674, filed Jul. 10, 2012; Title: Paging in Heterogeneous Networks Using Restricted Subframe Patterns.

Suzuki, Takashi, et al., U.S. Appl. No. 13/545,700, filed Jul. 10, 2012; Title: Paging in Heterogeneous Networks with Discontinuous Reception.

Suzuki, Takashi, et al.; U.S. Appl. No. 13/545,696, filed Jul. 10, 2012; Title: Accommodating Semi-Persistent Scheduling in Heterogeneous Networks with Restricted Subframe Patterns.

3GPP TS 36.321 V10.5.0; 3rd Generation Partnership Project; Technical Specification Group Radio Access Network; Evolved Universal Terrestrial Radio Access (E-UTRA); Medium Access Control (MAC) Protocol Specification; Release 10; Mar. 2012; 54 pages.

3GPP TS 36.304 V10.6.0; 3rd Generation Partnership Project; Technical Specification Group Radio Access Network; Evolved Universal Terrestrial Radio Access (E-UTRA); User Equipment (UE) Procedures in Idle Mode; Release 10; Jun. 2012; 33 pages.

3GPP TS 36.331 V10.6.0; 3rd Generation Partnership Project; Technical Specification Group Radio Access Network; Evolved Universal Terrestrial Radio Access (E-UTRA); Radio Resource Control (RRC); Protocol Specification; Release 10; Jun. 2012; 302 pages.

3GPP TS 36.300 V10.8.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2, Release 10; Jun. 2012; 194 pages.

3GPP TS 36.213 V10.6.0; 3rd Generation Partnership Project; Technical Specification Group Radio Access Network; Evolved Universal Terrestrial Radio Access (E-UTRA); Physical Layer Procedures; Release 10; Jun. 2012; 125 pages.

3GPP TSG-RAN WG2 Meeting #75bis; "Connected Mode Paging Enhancement"; R2-115347; Zhuhai, China; Oct. 10-14, 2011; 2 pages.

3GPP TSG-RAN WG2 Meeting #75; "Measurement Restriction for Inter-Frequency eICIC"; R2-113790; Athens, Greece; Aug. 22-26, 2011; 3 pages.

3GPP TSG-RAN WG2 Meeting #75; "Measurement Resource Restrictions for UE Rx-Tx Time Difference"; R2-114292; Athens, Greece; Aug. 22-26, 2011; 2 pages.

3GPP TSG-RAN WG2 Meeting #75; "Use Cases and Main Issues for Idle Mode eICIC"; R2-114436; Athens, Greece; Aug. 22-26, 2011; 3 pages.

3GPP TSG-RAN WG2 Meeting #75; "Correcting the Ambiguity of Modification-Period Boundaries"; R2-114447; Athens, Greece; Aug. 22-26, 2011; 7 pages.

PCT Search Report; Application No. PCT/US2012/035864; Nov. 28, 2012; 3 pages.

PCT Written Opinion of the International Searching Authority; Application No. PCT/US2012/035864; Nov. 28, 2012; 4 pages.

PCT Search Report; Application No. PCT/US2012/62806; Jan. 18, 2013; 2 pages.

PCT Written Opinion of the International Searching Authority; Application No. PCT/US2012/62806; Jan. 18, 2013; 6 pages.

PCT Search Report; Application No. PCT/US2012/62807; Jan. 18, 2013; 2 pages.

PCT Written Opinion of the International Searching Authority; Application No. PCT/US2012/62807; Jan. 18, 2013; 5 pages.

PCT Search Report; Application No. PCT/US2012/62808; Jan. 18, 2013; 2 pages.

PCT Written Opinion of the International Searching Authority; Application No. PCT/US2012/62808; Jan. 18, 2013; 7 pages.

Office Action dated Dec. 17, 2013; U.S. Appl. No. 13/545,700, filed Jul. 10, 2012; 25 pages.

Office Action dated Mar. 21, 2014; U.S. Appl. No. 13/545,674, filed Jul. 10, 2012; 27 pages.

(56) References Cited

OTHER PUBLICATIONS

Office Action dated Mar. 27, 2014; U.S. Appl. No. 13/545,696, filed Jul. 10, 2012; 54 pages.
Notice of Allowance dated Jul. 30, 2014; U.S. Appl. No. 13/545,674, filed Jul. 10, 2012; 18 pages.
Final Office Action dated Jun. 27, 2014; U.S. Appl. No. 13/545,700, filed Jul. 10, 2012; 29 pages.
Taiwan Office Action; Application No. 101140883; Jun. 10, 2014; 12 pages.
Notice of Allowance dated Oct. 10, 2014; U.S. Appl. No. 13/545,700, filed Jul. 10, 2012; 19 pages.
Final Office Action dated Sep. 16, 2014; U.S. Appl. No. 13/545,696, filed Jul. 10, 2012; 37 pages.
Taiwan Office Action; Application No. 101140890; Jul. 17, 2014; 14 pages.
Taiwan Office Action; Application No. 101140891; Sep. 5, 2014; 11 pages.
Suzuki, Takashi; U.S. Appl. No. 14/537,278, filed Nov. 10, 2014; Title: Paging in Heterogeneous Networks Using Restricted Subframe Patterns; 65 pages.
Notice of Allowance dated Nov. 25, 2014; U.S. Appl. No. 13/545,696, filed Jul. 10, 2012; 20 pages.
Korean Office Action as Received in Co-pending Application No. 10-2014-7010314 on Mar. 25, 2015; 4 pages. (No English translation available).
Canadian Office Action; Application No. 2,854,498; Feb. 2, 2015; 3 pages.
Office Action dated Jun. 9, 2015; U.S. Appl. No. 14/537,278, filed Nov. 10, 2014; 26 pages.
Canadian Office Action; Application No. 2,854,532; Jul. 27, 2015; 3 pages.
Partial European Search Report; Application No. 12845508.6; May 4, 2015; 6 pages.
Korean Office Action as Received in Co-pending Application No. 10-2014-7014563 on Jun. 4, 2015; 5 pages. (No English translation available).
Suzuki, Takashi; U.S. Appl. No. 14/834,753, filed Aug. 25, 2015; Title: Paging in Heterogeneous Networks Using Restricted Subframe Patterns; 60 pages.
3GPP TSG-RAN WG2 Meeting #75; "eICIC on Idle Mode Considerations"; R2-114050; Athens, Greece; Aug. 22-26, 2011; 4 pages.
3GPP TSG-RAN WG2 #75; "Almost Blank Subframes and IDLE Mode Operation"; R2-114503; Athens, Greece; Aug. 22-26, 2011; 3 pages.
3GPP TSG-RAN WG2 Meeting #75bis; "Detection of System Information Modification in HetNet"; R2-115160; Zhuahi, China; Oct. 10-14, 2011; 2 pages.
3GPP TSG-RAN2 Meeting #77; "36.331 CR on Detection of System Information Modification"; R2-120217; Dresden, Germany; Feb. 6-10, 2012; 2 pages.
European Extended Search Report; Application No. 12836529.3; Aug. 11, 2015; 9 pages.
Korean Office Action as Received in Co-pending Application No. 10-2014-7015182 on Aug. 10, 2015; 8 pages. (No English translation available).
Taiwan Office Action; Application No. 101140891; Jul. 6, 2015; 8 pages.
Korean Office Action as Received in Co-pending Application No. 10-2014-7015173 on Aug. 7, 2015; 8 pages. (No English translation available).
Canadian Office Action; Application No. 2,854,539; Aug. 6, 2015; 4 pages.
3GPP TSG RAN WG1 Meeting #62bis; "Support of Time Domain ICIC in Rel-10"; R1-105406; Xian, China; Oct. 11-15, 2010; 4 pages.
European Extended Search Report; Application No. 12845508.6; Sep. 4, 2015; 18 pages.
Notice of Allowance dated Sep. 23, 2015; U.S. Appl. No. 14/537,278, filed Nov. 10, 2014; 18 pages.
Korean Notice of Allowance; Application No. 10-2014-7010314; Oct. 16, 2015; 3 pages.

\* cited by examiner

ENHANCEMENT AND IMPROVEMENT FOR HETNET DEPLOYMENTS

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any hardware or software component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, or a similar component rather than a traditional base station. Any such component will be referred to herein as an eNB, but it should be understood that such a component is not necessarily an eNB. Such a component may also be referred to herein as an access node.

LTE may be said to correspond to Third Generation Partnership Project (3GPP) Release 8 (Rel-8 or R8), Release 9 (Rel-9 or R9), and Release 10 (Rel-10 or R10), and possibly also to releases beyond Release 10, while LTE Advanced (LTE-A) may be said to correspond to Release 10 and possibly also to releases beyond Release 10. While the discussion herein deals with LTE systems, the concepts are equally applicable to other wireless systems as well.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
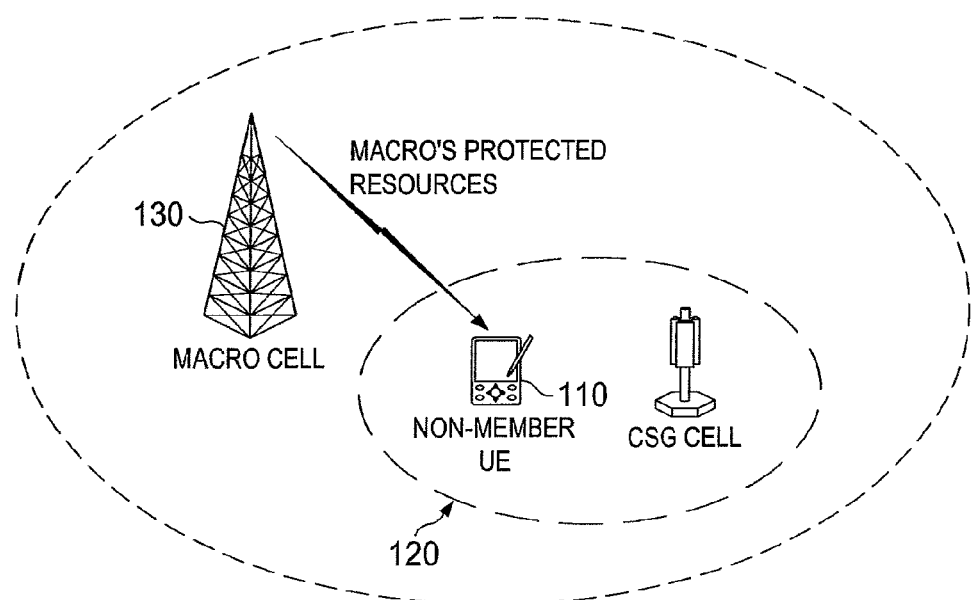
FIG. 1 is a diagram of a closed subscriber group hetnet deployment, according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

A heterogeneous network (hetnet) is a network that can include macro cells and low-power nodes such as pico cells, femto cells, and relays. The low power nodes or small cells can be overlaid on top of the macro cells, possibly sharing the same frequency. The small cells can offload the macro cells and improve indoor and cell edge performance. 3GPP has studied hetnet deployments as a performance enhancement enabler in LTE-Advanced (Release 10). In hetnet deployments, inter-cell interference coordination (ICIC) can prevent interference between the signals transmitted by the macro cell and the low-power nodes. Time domain-based resource sharing or coordination has been adopted as enhanced ICIC (eICIC). As described in 3GPP TS 36.300, the two main deployment scenarios where eICIC is utilized are a closed subscriber group (CSG) or femto cell scenario and a pico scenario.

In the CSG scenario, dominant interference condition may occur when non-member users are in close proximity to a CSG cell. Typically, the Physical Downlink Control Channel (PDCCH) might be severely interfered with by downlink transmissions from a non-member CSG cell. Interference to the PDCCH of the macro cell can have a detrimental impact on both uplink and downlink data transfer between the UE and the macro cell. In addition, other downlink control channels and reference signals, from both the macro cell and the neighbor cells, that may be used for cell measurements and radio link monitoring can also be interfered with by a downlink transmission from a non-member CSG cell. Depending on network deployment and strategy, it may not be possible to divert the users suffering from inter-cell interference to another E-UTRA (Evolved UMTS (Universal Mobile Telecommunications System) Terrestrial Radio Access) carrier or another radio access technology (RAT). Time domain ICIC may be used to allow such non-member UEs to remain served by the macro cell on the same frequency layer. Such interference may be mitigated by the CSG cell utilizing Almost Blank Subframes (ABSs) to protect the corresponding macro cell's subframes from the interference. ABSs are subframes with reduced transmit power and/or reduced activity (possibly including no transmission) on some physical channels. A non-member UE may be signaled to utilize the protected resources for radio resource management (RRM) measurements, radio link monitoring (RLM) and channel state information (CSI) measurements for the serving macro cell, allowing the UE to continue to be served by the macro cell under strong interference from the CSG cell.

An example of the CSG scenario is shown in FIG. 1. Since a UE 110 that is not a member of a CSG is within the coverage area of the CSG cell 120, signals from the CSG cell 120 could interfere with signals sent to the UE 110 from a macro cell 130.

In the pico scenario, time domain ICIC may be utilized for pico users that are served in the edge of the serving pico cell, e.g., for traffic off-loading from a macro cell to a pico cell. Typically, the PDCCH might be severely interfered by downlink transmission from the macro cell. In addition, other downlink control channels and reference signals, from both the pico cell and neighbor pico cells, that may be used for cell measurements and radio link monitoring can also be interfered with by a downlink transmission from the macro cell. Time domain ICIC may be utilized to allow such UEs to remain served by the pico cell on the same frequency layer. Such interference may be mitigated by the macro cell utilizing ABSs to protect the corresponding pico cell's subframes from the interference. A UE served by a pico cell can use the protected resources for RRM, RLM, and CSI measurements for the serving pico cell.

Figure 2:
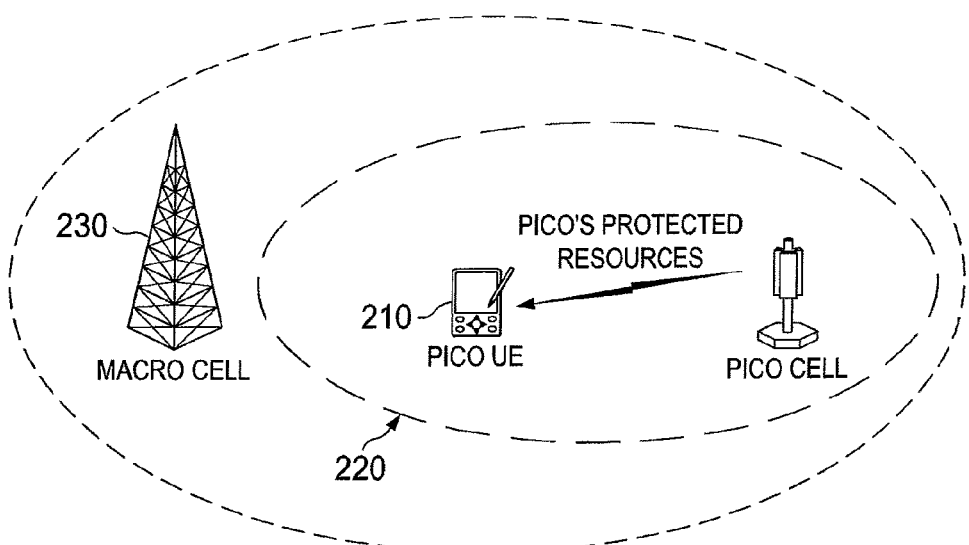
FIG. 2 is a diagram of a pico hetnet deployment, according to an embodiment of the disclosure.

An example of the pico scenario is shown in FIG. 2. A UE 210 that is at the edge of the coverage area of a pico cell 220 might be close enough to a macro cell 230 that signals from the macro cell 230 could interfere with signals sent to the UE 110 from the pico cell 220.

For time domain ICIC, subframe utilization across different cells can be coordinated in time through backhaul signaling or configuration of ABS patterns. The ABSs in an aggressor cell can be used to protect resources in subframes in a victim cell receiving strong inter-cell interference. The eNB can ensure backwards compatibility towards UEs by transmitting necessary control channels and physical signals as well as system information. Patterns based on ABSs are signaled to the UE to restrict the UE measurement to specific subframes, called time domain measurement resource restrictions. There are different patterns depending on the type of measured cell (serving or neighbor cell) and measurement type (e.g., RRM or RLM).

Figure 3:
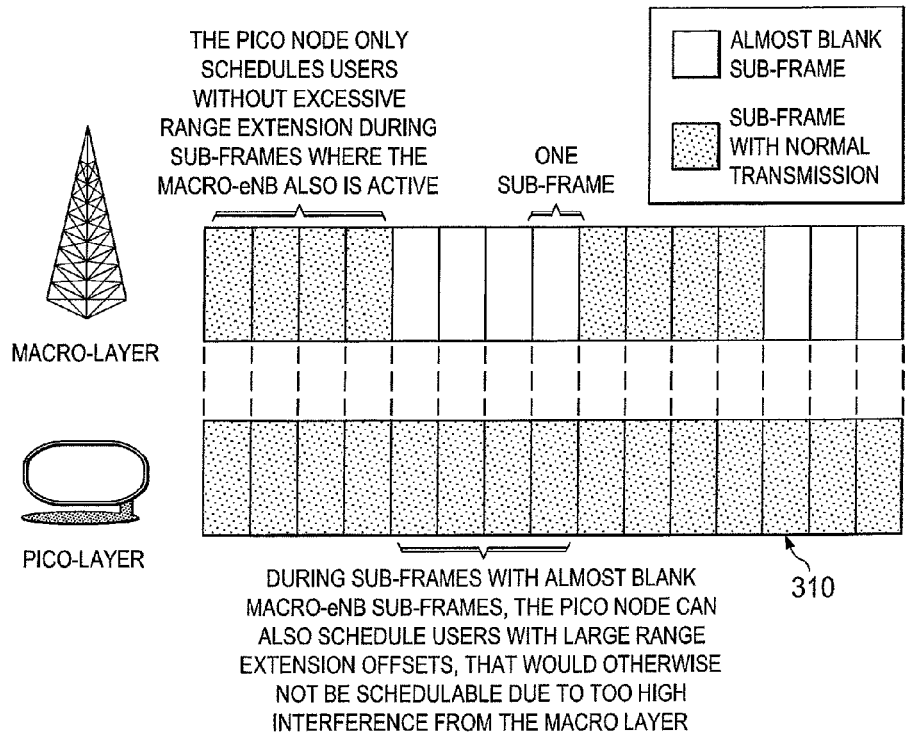
FIG. 3 is a diagram of examples of almost blank subframes, according to an embodiment of the disclosure.

An example of an ABS pattern for the pico scenario is shown in FIG. 3. In this example, the macro eNB (the aggressor) configures and transfers the ABS patterns to the pico eNB (victim). The macro eNB does not schedule data transmissions in ABS subframes to protect the UEs served by the pico eNB in the edge of the pico cell. The pico eNB may schedule transmission to and from the UEs in the cell center, regardless of the ABS patterns. Meanwhile, the pico eNB may schedule transmission to and from the UEs in the edge of the cell only in ABSs.

The pico cell eNB may configure a UE at the edge of the cell with three different measurement resource restrictions independently based on an ABS pattern received from the macro cell eNB. The first restriction is for RRM measurement and RLM for the PCell (in this case the serving pico cell). If configured, the UE measures and performs RLM of the PCell only in the configured subframes. The second restriction is for RRM measurement of neighbor cells on the primary frequency. If configured, the UE measures neighbor cells in the configured subframes only. The restriction also contains target neighbor cells optionally. The third restriction is for channel state estimation of the PCell. If configured, the UE estimates CSI and CQI/PMI/RI in the configured subframes only.

In some cases, Self Optimizing Network (SON) functionality may be provided in a hetnet. The objective of SON is to ease the burdens on operators in managing networks by automating configuration and optimization processes. Features that might be provided in a SON can include self configuration (automatic eNB installation and establishment of neighbor relations between cells, etc.), self optimization (load balancing and mobility robustness, etc.), and self-healing.

Figure 4:
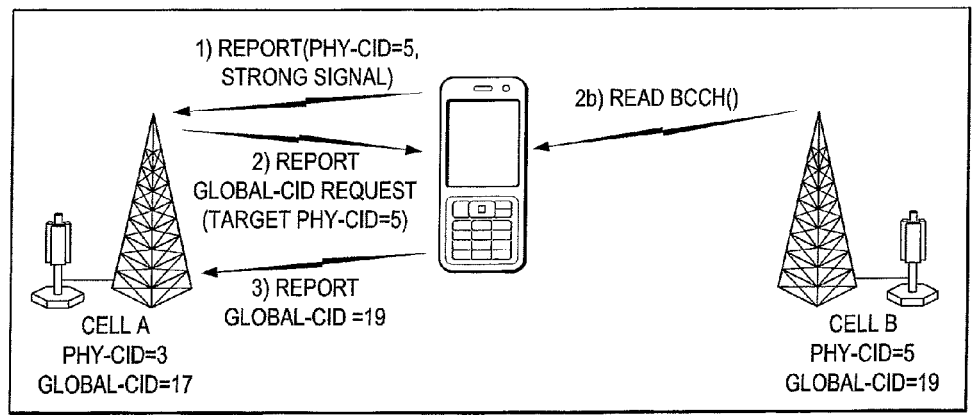
FIG. 4 is a diagram of UE support for automatic neighbor relation, according to an embodiment of the disclosure.

The UE can be involved in some of the processes. For example, as a part of the process for automatic neighbor relation establishment, the UE may be asked to identify the global cell identity of a cell the UE detected in the measurement procedure (steps 2, 2b, and 3 in FIG. 4). If the cell is a CSG cell, the UE can also report the CSG identity and whether the UE is member or not. The physical cell identify may be partitioned and the range may be signaled to the UE so that the UE can determine if the cell is a CSG or not from the physical cell identity without reading the system information.

With regard to mobility robustness optimization (MRO), the UE can create a radio link failure (RLF) report when RLF is detected. A Release 10 UE can keep the following information as an RLF report and report the information to the network as a part of the UE information procedure: the last measurement results taken in the PCell before handover or radio link failure; the best measured neighbor cells based on measurements collected up to the handover or radio link failure; available location information; the cell identity (cell global identity or physical cell identity plus carrier frequency) of the target PCell where handover failed or the PCell where radio link failure occurred; the global cell identity of the cell in which the re-establishment attempt was made; the global cell identity of the PCell where the last RRCConnectionReconfiguration message was received; the elapsed time since reception of the last RRCConnectionReconfiguration message; and the failure type (handover or radio link failure). The network analyzes the collected information, identifies the cause of failure (e.g., too early/late or wrong handover), and adjusts the parameters to reduce the number of future failures.

A procedure known as the Minimization of Drive Test (MDT) can be performed in a network to optimize coverage. An MDT-capable UE can record and report measurements to the network when configured by RRC. The operators can utilize such measurements collected by the UEs in a commercial network for coverage optimization, traffic verification, etc., thus reducing the number of drive tests. 3GPP studied MDT in the Release 9 time frame and standardized MDT as a Release 10 feature.

There are two modes of MDT reporting: logged MDT and immediate MDT. Logged MDT is idle mode logging. The main use case of logged MDT is to create coverage maps. The UE logs available RRM measurements of serving and neighbor cells according to the logged MDT configuration. The UE indicates the availability of the log when connected and the network may retrieve the log by a UE information procedure. The configuration is performed by an RRC message for the logged MDT configuration (logging intervals, duration and target area, etc.) during connected mode.

The main use case of immediate MDT is to detect uplink and downlink coverage issues in the connected mode. For downlink coverage, existing measurement reporting for RRM is used, and for uplink coverage, existing PHR is utilized. In Release 10 there are no MDT specific event triggers. There may be such event triggers defined for Release 11 enhancement.

For coverage optimization, the location of a measurement can be important, for example to identify coverage holes.

Therefore, for both logged and immediate MDT, if UE positioning information is available, e.g., coordinates by GPS, such information can be reported with the measurements.

Five issues are identified herein that are related to hetnet features that have been introduced in the LTE standards and to enhancement of the current MDT/SON features to support eICIC deployment. The first issue relates to the detection of a system information change in a hetnet environment. According to section 5.2.1.3 of 3GPP TS 36.331, the Paging message is used to inform UEs in RRC_IDLE and UEs in RRC_CONNECTED about a system information change. If the UE receives a Paging message including the systemInfoModification, the UE knows that the system information will change at the next modification period boundary. The UE verifies that stored system information remains valid by either checking systemInfoValueTag in SystemInformationBlockType1 after the modification period boundary or attempting to find the systemInfoModification indication at least modificationPeriodCoeff times during the modification period in case no paging is received, in every modification period. If no paging message is received by the UE during a modification period, the UE may assume that no change of system information will occur at the next modification period boundary. If a UE in RRC_CONNECTED, during a modification period, receives a paging message, the UE may deduce from the presence or absence of systemInfoModification whether or not a change of system information other than ETWS and CMAS information will occur in the next modification period.

A problem that may arise in these circumstances is that time domain measurement resource restriction for a PCell cannot always protect the paging occasions and frames from interference from the aggressor cells in a hetnet environment since the paging frame and paging occasion are dependent on the UE's International Mobile Subscriber Identity (IMSI). For example, depending on the network configuration and the IMSI, the paging occasion of a certain UE might be fixed to subframe number four, which may not be protected by the measurement restriction patterns. If the UE relies on paging reception to detect the system information change, the detection may fail.

For example, returning to FIG. 3, subframe 310 might be designated as a subframe for normal transmissions in the macro cell (FIG. 2 230). It could happen that a particular UE in the pico cell (FIG. 2 220) has an IMSI that causes the paging occasion for that UE to also occur in subframe 310. In such a case, a page to the UE might be interfered with by a cell-wide transmission in subframe 310. Paging to notify the presence of Earthquake and Tsunami Warning System (ETWS) or Commercial Mobile Alert Service (CMAS) information might be interfered with as well. The eNB may not update systemInfoValueTag upon change of some system information, such as ETWS information or CMAS information. ETWS and/or CMAS capable UEs in RRC_CONNECTED can attempt to read paging at least once every defaultPagingCycle to check whether ETWS and/or CMAS notification is present or not.

The second issue relates to the fact that cell range extension might require a cell list. For cell range extension of pico cells, in order to allow a macro UE to hand over to the extended edge of a pico cell, an offset value for the pico cell may need to be signaled to the UE so that the UE applies the offset to trigger a measurement report that favors the pico cell. Currently, the EUTRA measurement object includes a cell individual offset for each individual cell, regardless of the type of the cell, for example macro or pico cell. If many pico cells are deployed, the operators may have to manage the list of pico cells similarly to the UTRAN neighbor cell lists. EUTRA adopted UE detection of neighboring cells in order to reduce the need for neighbor cell list management. Pico cell list management may also need to be reduced.

Figure 5:
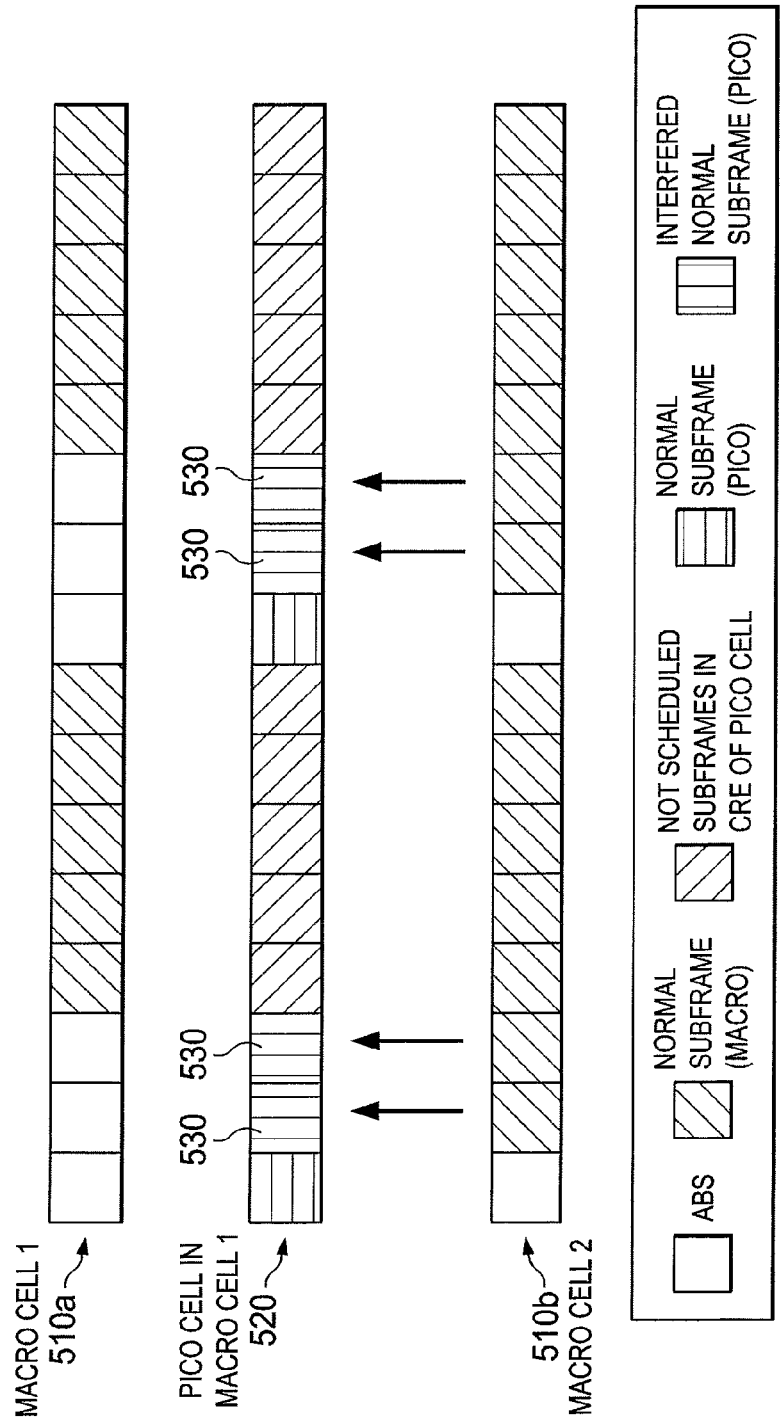
FIG. 5 is a diagram of interference caused by different almost blank subframes due to high traffic volume in a pico cell, according to an embodiment of the disclosure.

The third issue relates to the fact that S-Measure is currently based only on the Reference Signal Received Power (RSRP). Neighbor aggressor cells with different ABS patterns may schedule transmissions in the protected subframes of the victim cells, and unknown CSG cells that the UE is not allowed to access may suddenly appear (turned on) close to the UE, causing severe interference. In FIG. 5, two macro cells 510 have different ABS patterns due to a pico cell 520 in macro cell 1 510a having higher traffic volume. In this case, certain normal subframes 530 of the pico cell 520 may receive high interference, as indicated by the arrows. In such cases, Reference Signal Received Quality (RSRQ) measurement of the PCell could be very low, while its RSRP may be acceptable. If the situation continues, the UE could start looking for a better neighbor cell to avoid RLF or frequent transmission errors. However, currently S-Measure is defined for RSRP only, and the UE may not be able to start neighbor cell measurements in this situation.

The fourth issue relates to the RLF report with measurement resource restriction patterns. If the measurement resource restriction pattern for RLM is not properly configured, the UE will likely experience RLFs due to strong interference from the aggressor cells. If reestablishment is not successful, the network can lose track of the measurement resource restriction patterns being used before RLF. The network could lose important information for mobility robustness improvement in a hetnet deployment.

The fifth issue relates to the evaluation of measurement resource restriction patterns. Appropriate configuration of time domain measurement resource restriction patterns can be evaluated by the frequency of RLFs and ping pong problems. Immediate MDT support may need to be available in order to provide on-going connected mode measurements for more detailed evaluation.

Implementations that address each of these issues will now be considered. Regarding the first issue, transmission of system information includes Hybrid Automatic Repeat Request (HARQ) retransmissions, but transmission of paging messages does not include HARQ retransmissions. Therefore, reception of system information is more reliable than reception of paging information. Moreover, the schedule for system information transmission is cell-specific and fixed for the Master Information Block and the System Information Block Type1, and such fixed subframes may be protected by ABS patterns. In order to reliably detect a system information change in a hetnet environment, when measurement resource restrictions are configured (for example, measSubframePatternPCell), a UE can verify that stored system information remains valid by checking systemInfoValueTag in SystemInformationBlockType1 after the modification period boundary and by not attempting to find the systemInfoModification indication at least modificationPeriodCoeff times during the modification period. Alternatively, when measurement resource restriction for a PCell is configured, the UE can check if its paging frames and paging occasions are within the restricted subframes. When the paging occasions in its paging frames are in normal (not restricted) subframes or more than a certain percentage of the paging occasions in the paging frames are in normal (not restricted) subframes, the UE can verify that stored system information remains valid by checking systemInfoValueTag in SystemInformationBlockType1 after the modification period boundary. In yet another embodiment, when the UE fails to decode paging messages at a rate which is more than a certain threshold, the UE can verify that stored system information remains valid by checking systemInfoValueTag in SystemInformationBlockType1 after the modification period boundary.

Alternatively, the UE may increase the number of attempts to find the systemInfoModification indication more than modificationPeriodCoeff times during the modification period if more paging occasions are available to increase the reliability of paging decoding.

In order to avoid interference to the paging occasions to a specific UE, the network may page the UE configured with the measurement resource restriction in at least one restricted subframe subsequent to its paging occasions. The UE could attempt to find a paging message including the systemInfo-Modification indication in the restricted subframes subsequent to its paging occasions. The solution of shifting paging occasions to subsequent restricted subframes is applicable to the issue of ETWS and CMAS information notification. In order to shorten the latency, the eNB could page the UE in the restricted subframe immediately after the paging occasion. However, in order to avoid instantaneous overload of the Physical Downlink Shared Channel (PDSCH), the network may choose to page in the next restricted subframes after the subframe immediately after the paging occasion. The network may indicate how many subframes the UE needs to check after the paging occasion.

These concepts could be implemented with the changes to 3GPP TS 36.331 shown below, where revisions to the existing text are underlined.

5.2.1.3 System Information Validity and Notification of Changes

Change of system information (other than for ETWS and CMAS) only occurs at specific radio frames, i.e. the concept of a modification period is used. System information may be transmitted a number of times with the same content within a modification period, as defined by its scheduling. The modification period boundaries are defined by SFN values for which SFN mod m=0, where m is the number of radio frames comprising the modification period. The modification period is configured by system information.

Figure 9:
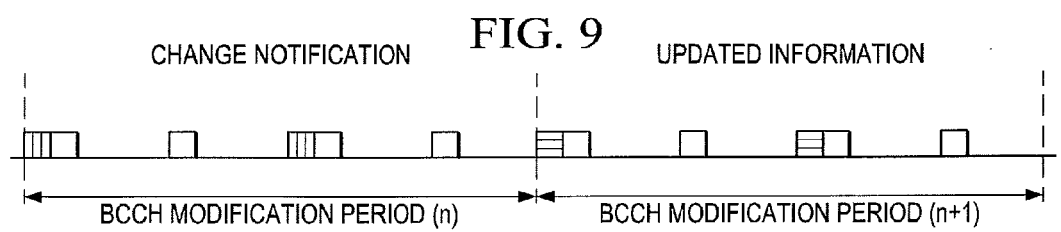
FIG. 9 illustrates a change of system information, according to an embodiment of the disclosure.

When the network changes (some of the) system information, it first notifies the UEs about this change, i.e. this may be done throughout a modification period. In the next modification period, the network transmits the updated system information. These general principles are illustrated in FIG. 9, in which different types of shading indicate different system information. Upon receiving a change notification, the UE acquires the new system information immediately from the start of the next modification period. The UE applies the previously acquired system information until the UE acquires the new system information.

The Paging message is used to inform UEs in RRC_IDLE and UEs in RRC_CONNECTED about a system information change. If the UE receives a Paging message including the systemInfoModification, it knows that the system information will change at the next modification period boundary. Although the UE may be informed about changes in system information, no further details are provided e.g. regarding which system information will change. SystemInformationBlockType1 includes a value tag, systemInfoValueTag, that indicates if a change has occurred in the SI messages. UEs may use systemInfoValueTag, e.g. upon return from out of coverage, to verify if the previously stored SI messages are still valid. Additionally, the UE considers stored system information to be invalid after 3 hours from the moment it was successfully confirmed as valid, unless specified otherwise. If measSubframePatternPCell is not configured, the UE verifies that stored system information remains valid by either checking systemInfoValueTag in SystemInformationBlockType1 after the modification period boundary, or attempting to find the systemInfoModification indication at least modificationPeriodCoeff times during the modification period in case no paging is received, in every modification period. If measSubframePatternPCell is configured, the UE verifies that stored system information remains valid by checking systemInfoValueTag in SystemInformationBlockType1 after the modification period boundary. If no paging message is received by the UE during a modification period, the UE may assume that no change of system information will occur at the next modification period boundary. If UE in RRC_CONNECTED, during a modification period, receives one paging message, it may deduce from the presence/absence of systemInfoModification whether a change of system information other than ETWS and CMAS information will occur in the next modification period or not.

With regard to the reception of system information, the UE may continuously fail to decode SystemInformationBlockType1 due to interference from aggressor cells. However, such a case can be avoided by network planning based on configurable parameters. More specifically, transmission on the PDCCH, the PDSCH, and/or the Physical Broadcast Channel (PBCH) can be scrambled by a pseudo-random sequence initialized by the physical cell identity. Therefore, as long as the cell range extension is not aggressive, the UE should be able to decode system information. Also, DCI format 1A and 1C can indicate the assignment of resource blocks by which a severely interfered area can be avoided for downlink transmissions including system information. In addition, the cell specific reference signals (CRS) and Physical Control Format Indication Channel (PCFICH) can be mapped to subcarriers with an offset that is based on the physical cell identity. Collision of the CRS and PCFICH between aggressor cells and the victim cell can be avoided by physical cell ID assignment.

If the UE continuously fails to decode SystemInformationBlockType1 or SystemInformationBlockType2, the UE may not flush the soft buffer at the end of the window for system information reception (SI-Window) and may continue to combine the subsequent transmissions with the stored information as long as the transmissions are within the modification period. With regard to ETWS or CMAS information reception, in order to avoid dependency on notification by paging in a hetnet environment, ETWS and/or CMAS capable UEs in RRC_CONNECTED can attempt to read systeminfromationblocktype1 at least once every defaultPagingCycle to check whether ETWS and/or CMAS notification is present or not.

Regarding the second issue, in an embodiment, in order to reduce the amount of cell information in an EUTRA measurement object in a hetnet deployment, a physical cell ID range of pico cells can be defined and signaled to the UE. In addition, a default cell individual offset (CIO) can be signaled to the UE, and the UE can apply this CIO to all cells that are detected with physical cell identities (PCIs) within the indicated range. In some deployment scenarios, pico cell physical cell identities may not be consecutive.

Alternatively to the cell identity ranges, the UE may determine a cell is a pico cell by the output of a function whose input is its physical cell identity. For example, a function may be modulo N, where N is a positive integer. If the output of the function is equal to a certain number P, then the cell is identified as a pico cell for cell range extension.

More specifically, in order to reduce the amount of cell information in an EUTRA measurement object in a hetnet deployment, a physical cell ID range of pico cells can be defined and signaled to the UE with a cell individual offset value. If there are multiple classes in output power of small cells, e.g., pico nodes and relay nodes, multiple sets of cell ID range and offset can be defined. The UE can apply the hetnet cell individual offset in the evaluation of event triggers if the physical cell identity of a neighbor cell is within the hetnet physical cell identity range.

Alternatively to the cell range indication, the pico cells may be identified by a certain function. For example, (physical cell id) mod N (N: positive integer). If the output is equal to M, the cell is identified as a pico cell for cell range extension. M may be set to 0. When M is set to 0, N may be 128 at the beginning of hetnet deployment. As the number of pico cells increases, N could be changed to 64 or 32, for example. In yet another embodiment, the pico cell PCI can be expressed by 6*N*M+P where N is a fixed integer, for example, 8, M is an integer, and P is an integer from 0 to 5. The mapping of reference signal to resource element is defined in 3GPP TS36.211, and the frequency shift is based on PCI mod 6 to avoid the collision of reference signals from neighboring cells. Having a specific frequency shift for the reference signals within a pico cells can mitigate interference from aggressors.

These concepts could be implemented with the changes to 3GPP TS 36.331 shown below, where revisions to the existing text are underlined.

5.5.2.5 Measurement Object Addition/Modification

The UE shall:

```
1> for each measObjectId included in the received measObjectToAddModList:
    2> if an entry with the matching measObjectId exists in the measObjectList within the VarMeasConfig, for this
        entry:
        3> replace the entry with the value received for this measObject, except for the fields cellsToAddModList,
            blackCellsToAddModList, cellsToRemoveList, blackCellsToRemoveList,
            measSubframePatternConfigNeigh, picoCellsToRemoveList and picoCellsToAddModList;
        3> if the received measObject includes the cellsToRemoveList:
            4> for each cellIndex included in the cellsToRemoveList:
                5> remove the entry with the matching cellIndex from the cellsToAddModList;
        3> if the received measObject includes the cellsToAddModList:
            4> for each cellIndex value included in the cellsToAddModList:
                5> if an entry with the matching cellIndex exists in the cellsToAddModList:
                    6> replace the entry with the value received for this cellIndex;
                5> else:
                    6> add a new entry for the received cellIndex to the cellsToAddModList;
        3> if the received measObject includes the blackCellsToRemoveList:
            4> for each cellIndex included in the blackCellsToRemoveList:
                5> remove the entry with the matching cellIndex from the blackCellsToAddModList;
        3> if the received measObject includes the blackCellsToAddModList:
            4> for each cellIndex included in the blackCellsToAddModList:
                5> if an entry with the matching cellIndex is included in the blackCellsToAddModList:
                    6> replace the entry with the value received for this cellIndex;
                5> else:
                    6> add a new entry for the received cellIndex to the blackCellsToAddModList;
        3> if the received measObject includes measSubframePatternConfigNeigh:
            4> set measSubframePatternConfigNeigh within the VarMeasConfig to the value of the received field
        3> for each measId associated with this measObjectId in the measIdList within the VarMeasConfig, if any:
            4> remove the measurement reporting entry for this measId from the VarMeasReportList, if included;
            4> stop the periodical reporting timer or timer T321, whichever one is running, and reset the associated
                information (e.g. timeToTrigger) for this measId;
        3> if the received measObject includes the picoCellsToRemoveList:
            4> for each cellIndex included in the picoCellsToRemoveList:
                5> remove the entry with the matching cellIndex from the picoCellsToRemoveList;
        3> if the received measObject includes the picoCellsToAddModList:
            4> for each cellIndex included in the picoCellsToAddModList:
                5> if an entry with the matching cellIndex is included in the picoCellsToAddModList:
                    6> replace the entry with the value received for this cellIndex;
                5> else:
                    6> add a new entry for the received cellIndex to the picoCellsToAddModList;
    2> else:
        3> add a new entry for the received measObject to the measObjectList within VarMeasConfig;
<Next change>
```

MeasObjectEUTRA Information Element

```
-- ASN1START
MeasObjectEUTRA ::=         SEQUENCE {
    carrierFreq                 ARFCN-ValueEUTRA,
    allowedMeasBandwidth        AllowedMeasBandwidth,
    presenceAntennaPort1        PresenceAntennaPort1,
    neighCellConfig             NeighCellConfig,
    offsetFreq                  Q-OffsetRange               DEFAULT dB0,
    -- Cell list
    cellsToRemoveList           CellIndexList               OPTIONAL,    -- Need ON
    cellsToAddModList           CellsToAddModList           OPTIONAL,    -- Need ON
    -- Black list
    blackCellsToRemoveList      CellIndexList               OPTIONAL,    -- Need ON
    blackCellsToAddModList      BlackCellsToAddModList      OPTIONAL,    -- Need ON
```

```
    cellForWhichToReportCGI            PhysCellId              OPTIONAL,      -- Need ON
...,
    [[measCycleSCell-r10               MeasCycleSCell-r10   OPTIONAL,       -- Need ON
    measSubframePatternConfigNeigh-r10MeasSubframePatternConfigNeigh-r10 OPTIONAL
        -- Need ON
    picoCellsToRemoveList-r10          CellIndexList           OPTIONAL,    -- Need ON
    picoCellsToAddModList-r10          PicoCellsToAddModList-r10 OPTIONAL   -- Need ON
    ]]
}
CellsToAddModList ::=              SEQUENCE (SIZE (1..maxCellMeas)) OF CellsToAddMod
CellsToAddMod ::=   SEQUENCE {
    cellIndex                      INTEGER (1..maxCellMeas),
    physCellId                     PhysCellId,
    cellIndividualOffset           Q-OffsetRange
}
BlackCellsToAddModList ::=         SEQUENCE (SIZE (1..maxCellMeas)) OF BlackCellsToAddMod
BlackCellsToAddMod ::=   SEQUENCE {
    cellIndex                      INTEGER (1..maxCellMeas),
    physCellIdRange                PhysCellIdRange
}
PicoCellsToAddModList-r10    SEQUENCE (SIZE (1..maxCellMeas)) OF PicoCellsToAddMod-r10
PicoCellsToAddMod-r10 ::=    SEQUENCE {
    cellIndex                      INTEGER (1..maxCellMeas),
    physCellIdRange-r10            PhysCellIdRange-r10,
    cellIndividualOffset           Q-OffsetRange
}
PhysCellIdRange-r10 ::= CHOICE {
    physCellIdRange                PhysCellIdRange,
    picoCellTwoNumbers             PicoCellTwoNumbers-r10
}
PicoCellTwoNumbers-r10 ::= {
    pico-divider        INTEGER,
    pico-remainder      INTEGER
}
```

MeasObjectEUTRA Field Descriptions

< Text omitted > picoCellsToRemoveList
List of pico cells to remove from the list of pico cells.
picoCellsToAddModList
List of pico cells to add or modify from the list of pico cells.
picoCellTwoNumber
The two numbers defines a pico cell. If (Physical cell id) mod (pico-divider) = pico-remainder, the cell is a pico cell According to 3GPP TS36.331, measSubframePatternConfigNeigh includes the actual subframe pattern (measSubframePatternNeigh) and the list of individual physical cell identities (measSubframeCellList) to which the subframe pattern is applied. measSubframeCellList may include the cell index defined above as a group of cells to which the pattern is applied.

Another advantage of the UE identifying pico cells is improved and more accurate mobility state evaluation. The current mobility state detection in 3GPP TS 36.331 only considers the number of handovers or cell reselections during the indicated time interval. If high or medium mobility is detected, the time to trigger or hysteresis parameter is scaled by the indicated high or medium speed factors. In an embodiment, the UE may consider that the count of handovers or cell reselections from the pico cell may be modified by a predetermined value less than 1, for example 0.5, in order to evaluate its mobility state more accurately. The network may include the mobility state detection factor, e.g. 0.5, in the pico cell list signaling described above. Alternatively, the UE may choose not to report pico cell measurements or not to reselect a pico cell in high mobility.

For example, if a UE experiences a specified number of handovers from one macro cell to another macro cell within a specified period of time, the UE might be considered to be in a high mobility state. Another UE moving more slowly might experience the same number of handovers from one pico cell to another pico cell in the same time period, since pico cells tend to be smaller than macro cells. If handovers between pico cells are counted equally to handovers between macro cells, the slow moving UE might erroneously be considered to be in the high mobility state. To prevent such an error, a transition to or from a pico cell could be counted as less than one transition or might not be counted at all.

Regarding the third issue, in an embodiment, the UE can start measuring neighboring cells when at least one of the RSRP measurement and the RSRQ measurement of the PCell falls below a corresponding threshold. The eNB may configure S-Measure in RSRQ when applicable to the UE in the hetnet environment. These concepts could be implemented with the changes to 3GPP TS 36.331 shown below, where revisions to the existing text are underlined.

5.5.3.1 General

For all measurements the UE applies the layer 3 filtering as specified in 5.5.3.2, before using the measured results for evaluation of reporting criteria or for measurement reporting. The UE shall:

1> whenever the UE has a measConfig, perform RSRP and RSRQ measurements for each serving cell, applying for the PCell the time domain measurement resource restriction in accordance with measSubframePatternPCell, if configured;

-continued

1> for each measId included in the measIdList within VarMeasConfig:
  2> if the purpose for the associated reportConfig is set to reportCGI:
    <text omitted>
  2> else:
    3> if a measurement gap configuration is setup; or
    3> if the UE does not require measurement gaps to perform the concerned measurements:
      4> if s-Measure is not configured; or
      4> if s-Measure is configured <u>in RSRP</u> and the PCell RSRP, after layer 3 filtering, is lower than this value<u>; or</u>
      <u>4> if s-Measure is configured in RSRQ and the PCell RSRQ, after layer 3 filtering, is lower than this value; or</u>
      <u>4> if s-Measure is configured in RSRP and RSRQ and the PCell RSRP and RSRQ, after layer 3 filtering, are lower than the corresponding values:</u>
        5> perform the corresponding measurements of neighbouring cells on the frequencies and RATs indicated in the concerned measObject, applying for neighbouring cells on the primary frequency the time domain measurement resource restriction in accordance with measSubframePatternConfigNeigh, if configured in the concerned measObject;
      4> if the ue-RxTxTimeDiffPeriodical is configured in the associated reportConfig:
        5> perform the UE Rx-Tx time difference measurements on the PCell;
  2> perform the evaluation of reporting criteria as specified in 5.5.4;
NOTE 3: The s-Measure defines when the UE is required to perform measurements. The UE is however allowed to perform measurements also when the PCell RSRP exceeds s-Measure <u>in RSRP or when the PCell RSRQ exceeds s-Measure in RSRQ</u>, e.g., to measure cells broadcasting a CSG identity following use of the autonomous search function as defined in TS 36.304 [4].
<next change>

5.5.4 Measurement Report Triggering
5.5.4.1 General
The UE shall:

1> for each measId included in the measIdList within VarMeasConfig:
  2> if the corresponding reportConfig includes a purpose set to 'reportStrongestCellsForSON':
    3> consider any neighbouring cell detected on the associated frequency to be applicable;
  2> else if the corresponding reportConfig includes a purpose set to 'reportCGI':
    3> consider any neighbouring cell detected on the associated frequency/ set of frequencies (GERAN) which has a physical cell identity matching the value of the cellForWhichToReportCGI included in the corresponding measObject within the VarMeasConfig to be applicable;
  2> else:
    3> if the corresponding measObject concerns E-UTRA:
      4> if the ue-RxTxTimeDiffPeriodical is configured in the corresponding reportConfig:
        5> consider only the PCell to be applicable;
      4> else if the eventA1 or eventA2 is configured in the corresponding reportConfig:
        5> consider only the serving cell to be applicable;
      4> else:
        5> consider any neighbouring cell detected on the associated frequency to be applicable when the concerned cell is not included in the blackCellsToAddModList defined within the VarMeasConfig for this measId;
        5> for events involving a serving cell on one frequency and neighbours on another frequency, the UE considers the serving cell on the other frequency as any other neighbouring cell;
    3> else if the corresponding measObject concerns UTRA or CDMA2000:
      4> consider a neighbouring cell on the associated frequency to be applicable when the concerned cell is included in the cellsToAddModList defined within the VarMeasConfig for this measId (i.e. the cell is included in the white-list);
NOTE 0: The UE may also consider a neighbouring cell on the associated UTRA frequency to be applicable when the concerned cell is included in the csg-allowedReportingCells within the VarMeasConfig for this measId, if configured in the corresponding measObjectUTRA (i.e. the cell is included in the range of physical cell identities for which reporting is allowed).
    3> else if the corresponding measObject concerns GERAN:
      4> consider a neighbouring cell on the associated set of frequencies to be applicable when the concerned cell matches the ncc-Permitted defined within the VarMeasConfig for this measId;
  2> if the triggerType is set to 'event' and if the entry condition applicable for this event, i.e. the event corresponding with the eventId of the corresponding reportConfig within VarMeasConfig, is fulfilled for one or more applicable cells for all measurements after layer 3 filtering taken during timeToTrigger defined for this event within the VarMeasConfig, while the VarMeasReportList does not include an measurement reporting entry for this measId (a first cell triggers the event):
    3> include a measurement reporting entry within the VarMeasReportList for this measId;
    3> set the numberOfReportsSent defined within the VarMeasReportList for this measId to 0;
    3> include the concerned cell(s) in the cellsTriggeredList defined within the VarMeasReportList for this measId;
    3> initiate the measurement reporting procedure, as specified in 5.5.5;
  2> if the triggerType is set to 'event' and if the entry condition applicable for this event, i.e. the event corresponding with the eventId of the corresponding reportConfig within VarMeasConfig, is fulfilled for one or more applicable cells not included in the cellsTriggeredList for all measurements after layer 3 filtering taken during timeToTrigger defined for this event within the VarMeasConfig (a subsequent cell triggers the event):
    3> set the numberOfReportsSent defined within the VarMeasReportList for this measId to 0;

3> include the concerned cell(s) in the cellsTriggeredList defined within the VarMeasReportList for this measId;
    3> initiate the measurement reporting procedure, as specified in 5.5.5;
  2>    if the triggerType is set to 'event' and if the leaving condition applicable for this event is fulfilled for one or more of the cells included in the cellsTriggeredList defined within the VarMeasReportList for this measId for all measurements after layer 3 filtering taken during timeToTrigger defined within the VarMeasConfig for this event:
    3> remove the concerned cell(s) in the cellsTriggeredList defined within the VarMeasReportList for this measId;
    3> if reportOnLeave is set to TRUE for the corresponding reporting configuration or if a6-ReportOnLeave is set to TRUE for the corresponding reporting configuration:
      4> initiate the measurement reporting procedure, as specified in 5.5.5;
    3> if the cellsTriggeredList defined within the VarMeasReportList for this measId is empty:
      4> remove the measurement reporting entry within the VarMeasReportList for this measId;
      4> stop the periodical reporting timer for this measId, if running;
  2> if the purpose is included and set to 'reportStrongestCells' or to 'reportStrongestCellsForSON' and if a (first) measurement result is available for one or more applicable cells:
    3> include a measurement reporting entry within the VarMeasReportList for this measId;
    3> set the numberOfReportsSent defined within the VarMeasReportList for this measId to 0;
    3> initiate the measurement reporting procedure, as specified in 5.5.5;
NOTE 1: If the purpose is set to 'reportStrongestCells', the UE initiates a first measurement report immediately after the quantity to be reported becomes available for at least either all serving cells or one of the applicable cells. If the purpose is set to 'reportStrongestCellsForSON', the UE initiates a first measurement report when it has determined the strongest cells on the associated frequency.
  2> upon expiry of the periodical reporting timer for this measId:
    3> initiate the measurement reporting procedure, as specified in 5.5.5;
  2> if the purpose is included and set to 'reportCGI' and if the UE acquired the information needed to set all fields of cgi-Info for the requested cell:
    3> include a measurement reporting entry within the VarMeasReportList for this measId;
    3> set the numberOfReportsSent defined within the VarMeasReportList for this measId to 0;
    3> stop timer T321;
    3> initiate the measurement reporting procedure, as specified in 5.5.5;
  2> upon expiry of the T321 for this measId:
    3> include a measurement reporting entry within the VarMeasReportList for this measId;
    3> set the numberOfReportsSent defined within the VarMeasReportList for this measId to 0;
    3> initiate the measurement reporting procedure, as specified in 5.5.5;
NOTE 2: The UE does not stop the periodical reporting with triggerType set to 'event' or to 'periodical' while the corresponding measurement is not performed due to the PCell RSRP and/or RSPQ being equal to or better than s-Measure RSRP and/or RSRQ or due to the measurement gap not being setup.
NOTE 3: If the UE is configured with DRX, the UE may delay the measurement reporting for event triggered and periodical triggered measurements until the Active Time, which is defined in TS 36.321 [6].
<next change>

MeasConfig Information Element   40

```
-- ASN1START
MeasConfig ::=              SEQUENCE {
    -- Measurement objects
    measObjectToRemoveList      MeasObjectToRemoveList      OPTIONAL,   -- Need ON
    measObjectToAddModList      MeasObjectToAddModList      OPTIONAL,   -- Need ON
    -- Reporting configurations
    reportConfigToRemoveList    ReportConfigToRemoveList    OPTIONAL,   -- Need ON
    reportConfigToAddModList    ReportConfigToAddModList    OPTIONAL,   -- Need ON
    -- Measurement identities
    measIdToRemoveList          MeasIdToRemoveList          OPTIONAL,   -- Need ON
    measIdToAddModList          MeasIdToAddModList          OPTIONAL,   -- Need ON
    -- Other parameters
    quantityConfig              QuantityConfig              OPTIONAL,   -- Need ON
    measGapConfig               MeasGapConfig               OPTIONAL,   -- Need ON
    s-Measure                   RSRP-Range                  OPTIONAL,   -- Need ON
    preRegistrationInfoHRPD     PreRegistrationInfoHRPD     OPTIONAL,   -- Need OP
    speedStatePars      CHOICE {
        release                 NULL,
        setup                   SEQUENCE {
            mobilityStateParameters     MobilityStateParameters,
            timeToTrigger-SF            SpeedStateScaleFactors
        }
    }                                                       OPTIONAL,   -- Need ON
    ...,
    S-Measure-r10               RSRQ-Range                  OPTIONAL,   -- Need ON
}
```

Regarding the fourth issue, the RLF report in current Release 10 standards includes information related to self optimization, such as: the last measurement results taken in the cell in which the radio link failure occurred before the radio link failure occurred; the best measured neighbor cells based on measurements collected up to the radio link failure; available location information; the cell identity of the cell where the radio link failure occurred; the global cell identity of a cell in which a re-establishment attempt was made; the global cell identity of a cell where the last RRCConnectionReconfiguration message was received; the elapsed time since reception of the last RRCConnectionReconfiguration message; and the failure type.

In an embodiment, an RLF report includes the measurement resource restriction patterns, if used, in the cell where RLF was experienced. The patterns and other measurements can be used in MRO procedures. In addition to the pattern, it may be useful to include the velocity or mobility state of the UE and whether short or long discontinuous reception (DRX) was being used when the RLF was experienced, because mobility state and DRX can impact measurement and cell detection performance, especially when the measurements are restricted within certain subframes.

More specifically, an RLF report could include at least one of the measurement resource restriction patterns for a PCell, neighbor cells, or CSI evaluation if the patterns are configured so that the patterns can be reported even when the reestablishment procedure fails. The information might be required for evaluation of measurement resource restriction patterns from mobility robustness optimization perspectives. The UE mobility state to be included in the RLF report may be based on the concepts described with regard to cell range extension or with regard to the RLF report. Alternatively, the UE may use the most recent available positioning information to calculate its moving speed. As for DRX, a variable to indicate whether short or long DRX was used when the RLF is detected can be included in the RLF report. The long or short DRX cycle length may be also included in the RLF report.

These concepts could be implemented with the changes to 3GPP TS 36.331 shown below, where revisions to the existing text are underlined.

5.3.11.3 Detection of Radio Link Failure

The UE shall:

1> upon T310 expiry; or
1> upon random access problem indication from MAC while neither T300, T301, T304 nor T311 is running; or
1> upon indication from RLC that the maximum number of retransmissions has been reached:
  2> consider radio link failure to be detected;
  2> store the following radio link failure information in the VarRLF-Report by setting its fields as follows:
    3> clear the information included in VarRLF-Report, if any;
    3> set the plmn-Identity to the RPLMN;
    3> set the measResultLastServCell to include the RSRP and RSRQ, if available, of the PCell based on measurements collected up to the moment the UE detected radio link failure;
    3> set the measResultNeighCells to include the best measured cells, other than the PCell, ordered such that the best cell is listed first, and based on measurements collected up to the moment the UE detected radio link failure, and set its fields as follows;
      4> if the UE was configured to perform measurements for one or more EUTRA frequencies, include the measResultListEUTRA;
      4> if the UE was configured to perform measurement reporting for one or more neighbouring UTRA frequencies, include the measResultListUTRA;
      4> if the UE was configured to perform measurement reporting for one or more neighbouring GERAN frequencies, include the measResultListGERAN;
      4> if the UE was configured to perform measurement reporting for one or more neighbouring CDMA2000 frequencies, include the measResultsCDMA2000;
  NOTE: The measured quantities are filtered by the L3 filter as configured in the mobility measurement configuration. The measurements are based on the time domain measurement resource restriction, if configured. Blacklisted cells are not required to be reported.
    3> if detailed location information is available, set the content of the locationInfo as follows:
      4> include the locationCoordinates;
      4> include the horizontalVelocity, if available;
    3> set the failedPCellId to the global cell identity, if available, and otherwise to the physical cell identity and carrier frequency of the PCell where radio link failure is detected;
    3> if an RRCConnectionReconfiguration message including the mobilityControlInfo was received before the connection failure:
      4> include previousPCellId and set it to the global cell identity of the PCell where the last RRCConnectionReconfiguration including the mobilityControlInfo message was received;
      4> set the timeConnFailure to the elapsed time since reception of the last RRCConnectionReconfiguration message including the mobilityControlInfo;
    3> <u>include measSubframePatternPCell and set it to measSubframePatternPCell if configured for failedPCellId;</u>
    3> <u>include csi-MeasSubframeSet1 and csi-MeasSubframeSet2 and set them to csi-MeasSubframeSet1 and csi-MeasSubframeSet2 if configured for failedPCellId;</u>
    3> <u>include measSubframePatternConfigNeigh and set it to measSubframePatternConfigNeigh if configured for the carrier frequency of the PCell where radio link failure is detected;</u>
    3> <u>include shortDRX-Cycle and set it to shortDRX-Cycle if configured and used when radio link failure is detected;</u>
    3> <u>include longDRX-Cycle and set it to longDRX-Cycle if configured and used when radio link failure is detected;</u>
    3> <u>include mobility state detected when radio link failure is detected and set it to mobilityState;</u>
    3> set the connectionFailureType to rlf;
  2> if AS security has not been activated:
    3> perform the actions upon leaving RRC_CONNECTED as specified in 5.3.12, with release cause 'other';
  2> else:
    3> initiate the connection re-establishment procedure as specified in 5.3.7;
The UE may discard the radio link failure information, i.e. release the UE variable VarRLF-Report 48 hours after the radio link failure is detected.
<next change>

```
RLF-Report-r9 ::=                       SEQUENCE {
    measResultLastServCell-r9               SEQUENCE {
        rsrpResult-r9                           RSRP-Range,
        rsrqResult-r9                           RSRQ-Range       OPTIONAL
    },
    measResultNeighCells-r9                 SEQUENCE {
        measResultListEUTRA-r9                  MeasResultList2EUTRA-r9      OPTIONAL,
        measResultListUTRA-r9                   MeasResultList2UTRA-r9       OPTIONAL,
        measResultListGERAN-r9                  MeasResultListGERAN          OPTIONAL,
        measResultsCDMA2000-r9                  MeasResultList2CDMA2000-r9   OPTIONAL
    } OPTIONAL,
    ...,
    [[  locationInfo-r10                    LocationInfo-r10    OPTIONAL,
        failedPCellId-r10                       CHOICE {
            cellGlobalId-r10                        CellGlobalIdEUTRA,
            pci-arfcn-r10                           SEQUENCE {
                physCellId-r10                          PhysCellId,
                carrierFreq-r10                         ARFCN-ValueEUTRA
            }
        }                                                           OPTIONAL,
        reestablishmentCellId-r10               CellGlobalIdEUTRA   OPTIONAL,
        timeConnFailure-r10                     INTEGER (0..1023)   OPTIONAL,
        connectionFailureType-r10               ENUMERATED {rlf, hof}   OPTIONAL,
        previousPCellId-r10                     CellGlobalIdEUTRA   OPTIONAL,
        measSubframePatternPCell-r10            MeasSubframePatternPCell-r10   OPTIONAL,
        csi-MeasSubframeSet1-r10                MeasSubframePattern-r10    OPTIONAL,
        csi-MeasSubframeSet2-r10                MeasSubframePattern-r10    OPTIONAL,
        measSubframePatternConfigNeigh-r10 MeasSubframePatternConfigNeigh-r10 OPTIONAL,
        shortDRX-Cycle                          CHOICE { } OPTIONAL -- same as longDRX-CycleStartOffset in DRXConfig
        longDRX-Cycle                           ENUMERATED { } OPTIONAL, -- same as shortDRX-Cycle in DRXConfig
        mobilityState                           ENUMERATED {low, middle, high} OPTIONAL
    ]]
}
```

Regarding the fifth issue, in connected mode, the UE is usually configured with intra-frequency measurement. In an embodiment, based on at least one of RSRP, RSRQ, and RSSI (Received Signal Strength Indicator) measurements reported from the UE, the eNB may decide if measurement resource restriction is required to avoid interference. For example, when the UE is moving from a pico cell center to a cell edge extension area, the network may configure the measurement restrictions based on the measurement of the PCell. In the reverse direction, the network may release the measurement restriction based on the measurement of the PCell. In the cell edge extension area or an area very close to a disallowed CSG cell, RSRQ measurements taken with measurement resource restriction may be different from measurements taken without measurement resource restriction.

In order to provide the network with feedback with regard to the effectiveness of the patterns, the UE may report a first measurement taken with measurement resource restrictions and a second measurement taken without measurement resource restrictions, when the measurement restrictions are configured. Alternatively the first measurement may be taken within restricted subframes and the second measurement taken within normal (not restricted) subframes. In yet another alternative, the first measurement may be taken within the first restricted subframes and the second measurement may be taken within the second restricted subframes. The UE may report both the first and second measurements at least once or periodically according to the measurement configuration indicated by the eNB. Alternatively, the UE might report the first measurement and the difference between the first and second measurement at least once or periodically. The UE may start reporting the measurements when a certain condition is satisfied and may stop reporting the measurements when a certain condition is satisfied. Such a condition may be that the difference between the first and second measurements is less than or greater than a threshold. Such a condition may be defined as an event trigger of immediate MDT or normal RRM measurement. For the purpose of the evaluation described above, a stationary UE in the connected state in the cell range extension area could be chosen. When the difference remains low, the network may configure a different pattern. When the difference rises above a threshold, the network may release the measurement restriction.

Alternatively, the network could rely on the reporting from the UE to decide the best measurement restriction patterns. For example, the network may configure a periodic measurement in which the UE will report the subframe number of the best RSRQ measurement with the best measurement and the subframe of the worst RSRQ measurement with the worst measurement within the specified measurement period.

More specifically, if the difference between the first and second measurements is smaller or larger than a threshold (triggering condition), the UE can start reporting both measurements or the first measurement with a delta between the two measurements. If the difference becomes higher or lower than a threshold (release condition), the UE can stop reporting both measurements or the first measurement with a delta between the two measurements.

Such an alert can be implemented by defining immediate MDT or RRM measurement event triggers. As an example, the following events may be defined: Event H1: Difference between averaged (layer 3 filtered) RSRQ measurements of the PCell taken with and without MeasSubframePatternPCell or taken within restricted subframes and normal subframes becomes higher or lower than a threshold (trigger condition). The difference becomes lower or higher than a threshold (release condition); Event H2: Difference between averaged (layer 3 filtered) RSRQ measurements of the neighbor cells taken with and without measSubframePatternNeigh or taken during the restricted subframes and during the normal subframes becomes higher or lower than a threshold (trigger condition). The difference becomes lower or higher than a threshold (release condition); Event H3: Difference between averaged CSI values evaluated with csi-MeasSubframeSet1 and csi-MeasSubframeSet2 becomes higher or lower than a threshold (trigger condition). The difference becomes lower or higher than a threshold (release condition).

Alternatively, the network may decide the best measurement restriction patterns based on the UE measurement reports. For example, the network may configure a periodic measurement in which the UE will report the subframe number of the best RSRQ measurement and the subframe of the worst RSRQ measurement within the specified measurement period. Such measurement may require higher processing power from the UE, and therefore it may be part of a logged MDT measurement, where the measurement results are not immediately reported but logged in the UE.

The implementations described herein can allow detection of system information change to be made reliably in hetnet environment. The implementations can also allow operators to be freed from configuration management of individual pico cells overlaid on macro cells. In addition, the probability of radio link failure can be reduced in a hetnet deployment. Further, operators can evaluate the relation between RLF and measurement resource restriction patterns. Faster feedback with regard to the effect of measurement resource restriction patterns can also be provided.

Figure 6:
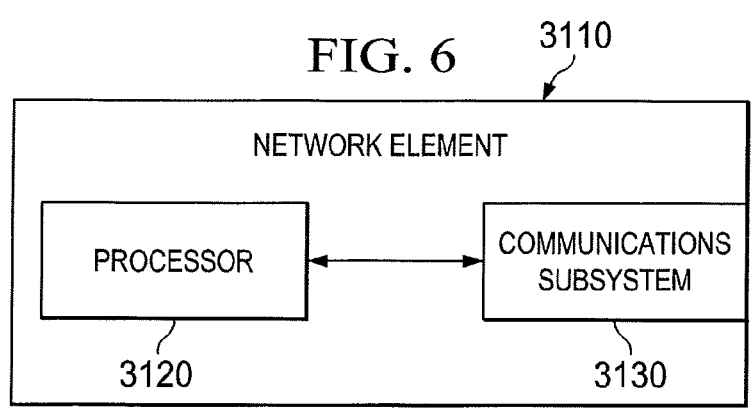
FIG. 6 is a simplified block diagram of an exemplary network element according to one embodiment.

The concepts described above may be implemented by a network element. A simplified network element is shown with regard to FIG. 6. In FIG. 6, network element 3110 includes a processor 3120 and a communications subsystem 3130, where the processor 3120 and communications subsystem 3130 cooperate to perform the methods described above.

Further, the above may be implemented by a UE. One exemplary device is described below with regard to FIG. 7. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

Figure 7:
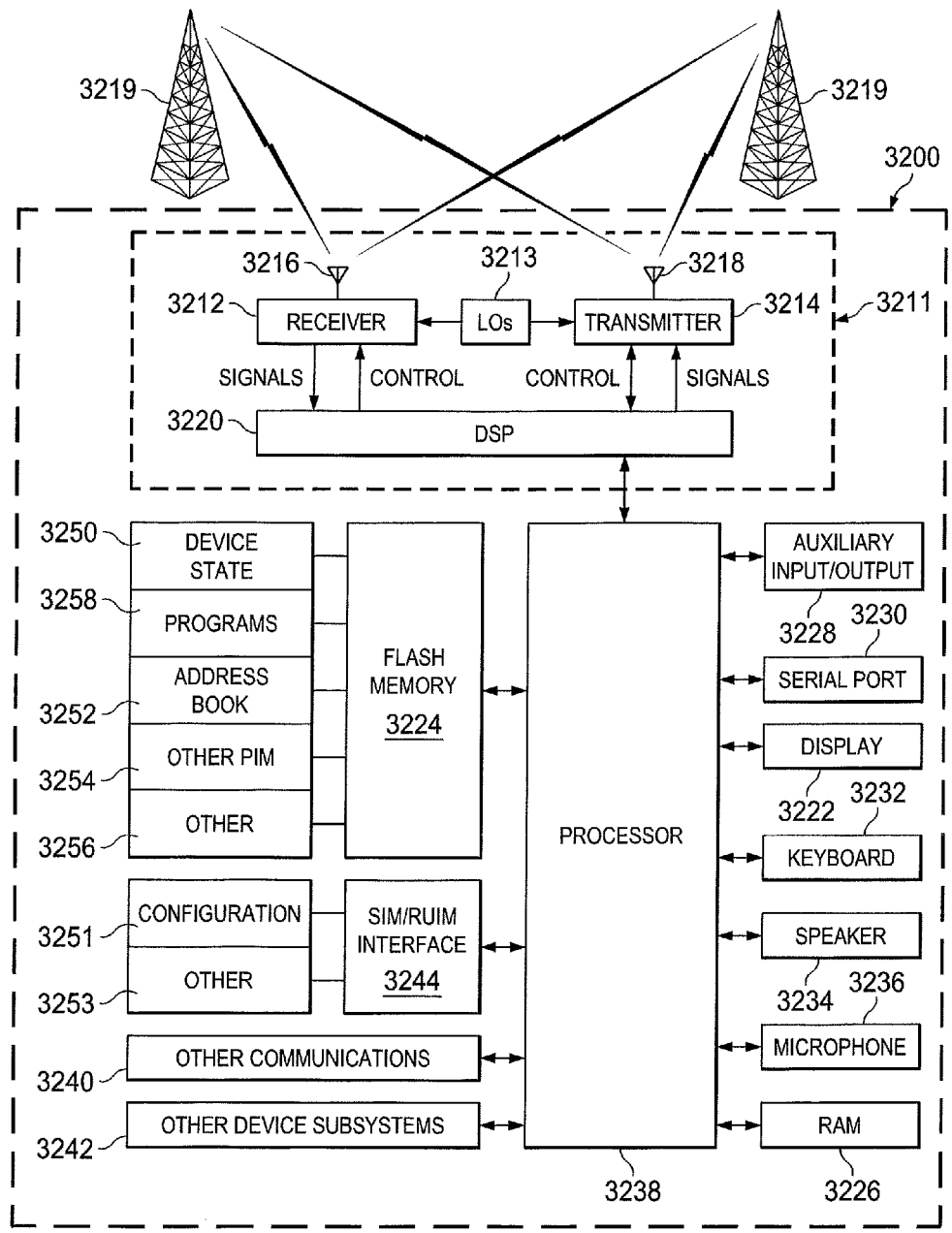
FIG. 7 is a block diagram with an example user equipment capable of being used with the systems and methods in the embodiments described herein.

When required network registration or activation procedures have been completed, UE 3200 may send and receive communication signals over the network 3219. As illustrated in FIG. 7, network 3219 can consist of multiple base stations communicating with the UE.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 could include a USB port or other port known to those in the art.

Some of the subsystems shown in FIG. 7 perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 in FIG. 7 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 8:
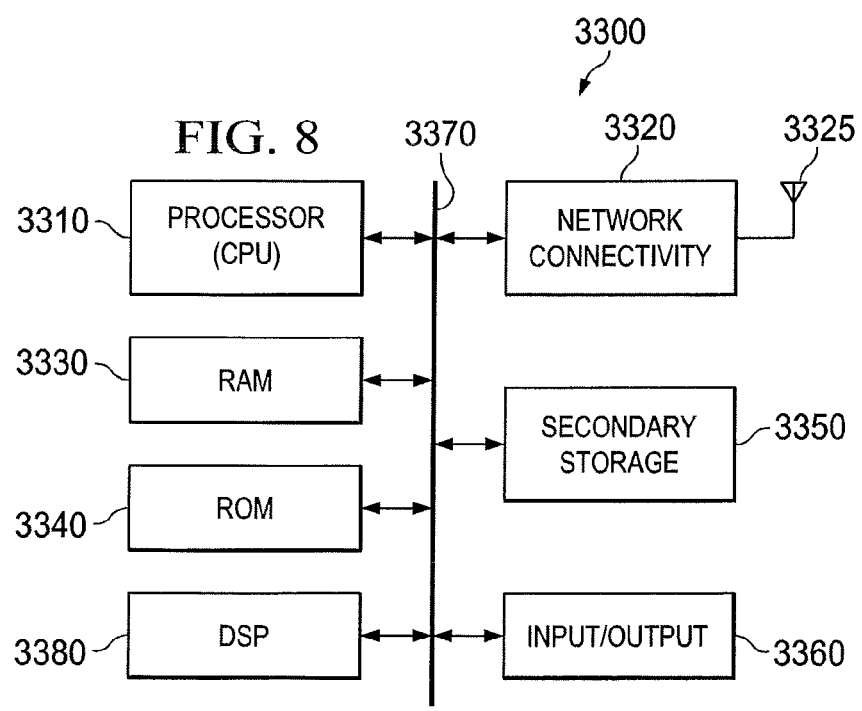
FIG. 8 illustrates a processor and related components suitable for implementing the several embodiments of the present disclosure.

The UE and other components described above might include a processing component that is capable of executing instructions related to the actions described above. FIG. 8 illustrates an example of a system 3300 that includes a processing component 3310 suitable for implementing one or more embodiments disclosed herein. The processing component 3310 may be substantially similar to the processor 3120 of FIG. 6 and/or the processor 3238 of FIG. 7.

In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

In an implementation, a method is provided for communication. The method comprises, when a measurement resource restriction is configured, verifying whether stored system information is valid by examining a system information identifier after a modification period has occurred. The UE can check if its paging occasions in its paging frame are within normal subframes or if a certain percentage of its paging occasions within its paging frames are within normal subframes, and when the paging occasions or the percentage of paging occasions are within normal subframes, the UE can verify that stored system information is valid by checking systemInfoValueTag in SystemInformationBlockType1 after the modification period has occurred.

In another implementation, a UE is provided. The UE includes a processor configured such that, when a measurement resource restriction is configured, the UE verifies whether stored system information is valid by examining a system information identifier after a modification period has occurred.

In another implementation, a network element is provided. The network element includes a processor configured such that the network element pages a UE that is configured with at least one measurement resource restriction, the paging occurring in at least one restricted subframe subsequent to a scheduled paging occasion for the UE.

In another implementation, a method for communication is provided. The method comprises, in a heterogeneous network deployment, a network element transmitting to a UE a range of cell identifiers for pico cells that are available to the UE. Alternatively, a UE is provided. The UE comprises a processor configured such that the UE uses a cell identifier for a cell in which the UE is present as an input to a formula, the output of the formula indicating whether the cell is a pico cell. In a count of handovers and cell reselections for the purpose of determining the mobility of the UE, handovers and cell reselections of the UE to or from a pico cell might be weighted less than handovers and cell reselections between macro cells. A network element might signal a scaling factor related to the weighting to the UE. Alternatively, handovers and cell reselections of the UE to or from a pico cell might not be counted in the count of handovers and cell reselections.

In another implementation, a UE is provided. The UE comprises a processor configured such that the UE begins performing measurements of signals from neighboring cells in a heterogeneous network deployment when a reference signal received quality measurement for a cell in which the UE is present falls below a threshold.

In another implementation, a method for communication is provided. The method comprises, in a heterogeneous network deployment in which the use of almost blank subframes is configured, including in a radio link failure report information about restrictions imposed on the almost blank subframes. The radio link failure report might further include information related to the mobility state of a UE that generated the radio link failure report. The radio link failure report might further include information related to a type of discontinuous reception being used by a UE when the radio link failure is detected.

In another implementation, a method for communication is provided. The method comprises, when at least one measurement resource restriction is configured in a heterogeneous network deployment, performing a first signal measurement with at least one measurement resource restriction in place and performing a second signal measurement without the at least one measurement resource restriction in place, and when the difference between the first measurement and the second measurement is greater than a threshold, refraining from or starting reporting measurement results, and when the difference between the first measurement and the second measurement is less than the threshold, starting or refraining from reporting measurement results. The method might further comprise, when the difference between the first measurement and the second measurement is less than the threshold, using a measurement resource restriction pattern that is different from the measurement resource restriction previously used. Alternatively, another method for communication is provided. The method comprises, performing signal quality measurements on a plurality of subframes and basing a measurement resource restriction pattern on the signal quality measurements.

In another implementation, a method for communication is provided. The method comprises a UE receiving system information and increasing a number of attempts to find a system modification identifier more than modificationPeriodCoeff times during a modification period.

In another implementation, a method for communication is provided. The method comprises a network element paging a UE configured with at least one measurement resource restriction, the paging occurring in at least one restricted subframe subsequent to a scheduled paging occasion for the UE.

In another implementation, a method for communication is provided. The method comprises, when a UE fails to decode paging messages at a rate greater than a threshold, the UE verifies that stored system information is valid by checking systemInfoValueTag in SystemInformationBlockType1 after a modification period has occurred.

In another implementation, a method for communication is provided. The method comprises, if a measurement resource restriction is configured, or if a UE's paging occasions in its paging frames are within normal subframes, or if a certain percentage of the UE's paging occasions within its paging frames are within normal subframes, of if a failure rate of paging message decoding becomes more than a threshold, ETWS and/or CMAS capable UEs in RRC_CONNECTED attempt to read systeminfromationblocktype1 at least once every defaultPagingCycle to check whether ETWS and/or CMAS notification is present or not.

The following are incorporated herein by reference for all purposes: 3GPP TS 36.211, 3GPP TS 36.300, 3GPP TS 36.304, 3GPP TR 36.320, 3GPP TR 36.331, and 3GPP TR 36.805.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for communication, comprising:
   when a measurement resource restriction is configured, verifying whether stored system information is valid by examining a value tag of system information messages after a boundary of a modification period has occurred,
   wherein, when a user equipment (UE) is in a connected mode, an attempt is not made by the UE to read a paging message to find a system information modification indication during the modification period.

2. The method of claim 1, wherein the value tag of the system information messages is the systemInfoValueTag in SystemInformationBlockType1.

3. The method of claim 1, wherein the system modification indication is the systemInfoModification indication in a Paging message.

4. The method of claim 1, wherein the measurement resource restriction is at least one of:
   restricting a user equipment (UE) to performing radio resource management measurement and radio link monitoring for a serving cell only in indicated subframes,
   restricting the UE to performing radio resource management measurement for a neighbor cell only in indicated subframes; and
   restricting the UE to performing channel state estimation only in indicated subframes.

5. The method of claim 1, wherein, when the UE fails to decode the system information, the UE does not flush a soft buffer at the end of a window for system information reception and combines subsequent transmissions of the system information with the stored information in the soft buffer as long as transmissions of the system information are within the modification period.

6. The method of claim 1, wherein the UE checks if its paging occasions in its paging frame are within normal subframes or if a certain percentage of its paging occasions within its paging frames are within normal subframes, the UE verifies that stored system information is valid by checking systemInfoValueTag in SystemInformationBlockType1 after the boundary of the modification period has occurred.

7. A user equipment (UE), comprising:
   a processor configured such that, when a measurement resource restriction is configured, the UE verifies whether stored system information is valid by examining a value tag of system information messages after a boundary of a modification period has occurred,
   wherein, when the UE is in a connected mode, the UE does not attempt to read a paging message to find a system information modification indication during the modification period.

8. The UE of claim 7, wherein the value tag of the system information messages is the systemInfoValueTag in SystemInformationBlockType1.

9. The UE of claim 7, wherein the system modification indication is the systemInfoModification indication in a Paging message.

10. The UE of claim 7, wherein the measurement resource restriction is at least one of:
    restricting the UE to performing radio resource management measurement and radio link monitoring for a serving cell only in indicated subframes;
    restricting the UE to performing radio resource management measurement for a neighbor cell only in indicated subframes; and
    restricting the UE to performing channel state estimation only in indicated subframes.

11. The UE of claim 7, wherein, when the UE fails to decode the system information, the UE does not flush a soft buffer at the end of a window for system information reception and combines subsequent transmissions of the system information with the stored information in the soft buffer as long as transmissions of the system information are within the modification period.

12. The UE of claim 7 wherein, when the UE checks if its paging occasions in its paging frame are within normal subframes or if a certain percentage of its paging occasions within its paging frames are within normal subframes, the UE verifies that stored system information is valid by checking systemInfoValueTag in SystemInformationBlockType1 after the boundary of the modification period has occurred.

13. A network element, comprising:
    a processor configured such that the network element pages a user equipment (UE) that is configured with at least one measurement resource restriction, the paging occurring in at least one restricted subframe subsequent to a scheduled paging occasion for the UE,
    wherein the network element indicates the number of subframes after the scheduled paging occasion the UE is to check for a page from the network element.

14. The network element of claim 13, wherein the page includes a system modification identifier.

15. The network element of claim 13, wherein the measurement resource restriction is at least one of:
    restricting the UE to performing radio resource management measurement and radio link monitoring for a serving cell only in indicated subframes;
    restricting the UE to performing radio resource management measurement for a neighbor cell only in indicated subframes; and
    restricting the UE to performing channel state estimation only in indicated subframes.

16. A method for communication, comprising:
    when a measurement resource restriction is configured, verifying whether stored system information is valid by examining a value tag of system information messages after a boundary of a modification period has occurred, wherein an attempt is not made to find a system information modification indication during the modification period, and wherein the measurement resource restriction at least includes restricting a user equipment (UE) to performing radio resource management measurement and radio link monitoring for a serving cell only in indicated subframes.

* * * * *